United States Patent [19]

Suganuma et al.

[11] Patent Number: 4,521,096
[45] Date of Patent: Jun. 4, 1985

[54] APPARATUS FOR COMBINING INFORMATION FROM DIFFERENT FORMS TO GENERATE COMPOSITE SLIPS

[75] Inventors: Saburo Suganuma; Hiroyuki Kataoka, both of Kanagawa, Japan

[73] Assignee: Fuji Xerox Co., Ltd., Tokyo, Japan

[21] Appl. No.: 403,191

[22] Filed: Jul. 29, 1982

[30] Foreign Application Priority Data

Jul. 30, 1981 [JP] Japan .................................. 56-118471

[51] Int. Cl.³ ............................................ G03G 15/00
[52] U.S. Cl. ........................................ 355/3 R; 355/7
[58] Field of Search ..................... 355/7, 3 R, 14 C, 8; 354/3, 6

[56] References Cited

U.S. PATENT DOCUMENTS

| | | | |
|---|---|---|---|
| 4,268,164 | 5/1981 | Yajima et al. | 355/7 X |
| 4,320,962 | 3/1982 | Takahashi et al. | 355/3 R |
| 4,322,157 | 3/1982 | Miura et al. | 355/7 X |
| 4,344,713 | 8/1982 | Cullen | 355/3 R |
| 4,371,898 | 2/1983 | Nakamura | 355/7 X |

Primary Examiner—R. L. Moses
Attorney, Agent, or Firm—Sughrue, Mion, Zinn, Macpeak & Seas

[57] ABSTRACT

A slip processing apparatus especially adapted for generating transportation slips from gift purchase applications in a department store. A form memory stores an image of a plurality of identical transportation slips on a single sheet while a data memory stores data read from a gift purchase application. The gift purchase application contains a plurality of consignee of addressee entries and a single entry of the consignor or requesting person. Editing means distributes the data from the gift purchase application onto the transportation slips so that each transportation slip bears the name of both the consignee and consignor. Plural identical transportation slips can be printed if desired.

6 Claims, 13 Drawing Figures

FIG. 1a  FIG. 1b  FIG. 1c
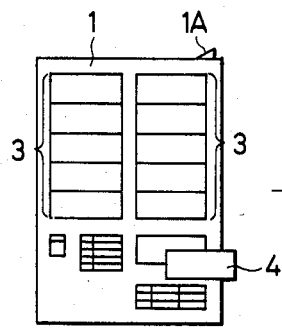 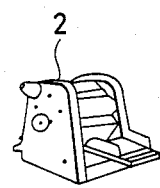 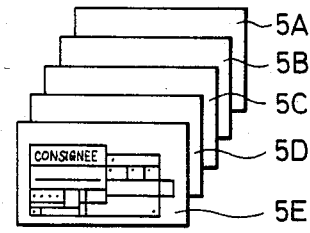
FIG. 2a  FIG. 2b
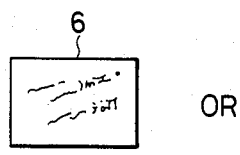 OR 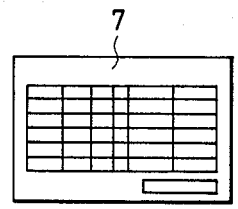

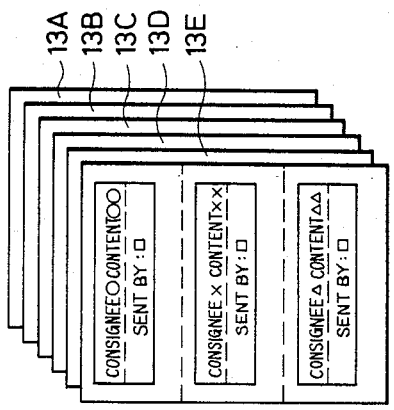
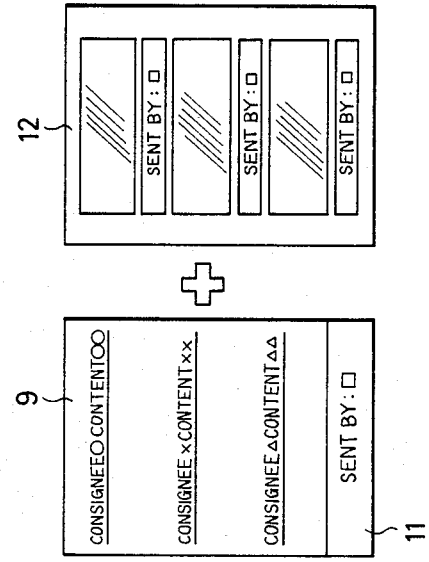
FIG. 3b
FIG. 3a

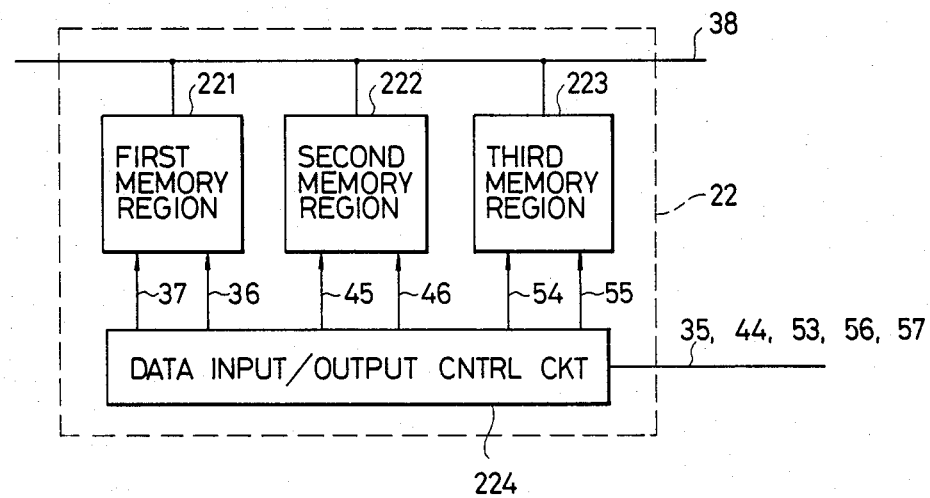

APPARATUS FOR COMBINING INFORMATION FROM DIFFERENT FORMS TO GENERATE COMPOSITE SLIPS

BACKGROUND OF THE INVENTION

The present invention relates to a slip processing apparatus which can process a plurality of slips of different forms but which are related to one another.

In a department store, for instance, a number of transportation slips must be prepared when transportation of a commodity is requested by a customer. For example, there may be prepared: (1) a work slip which relates to the removal of the commodity from storage and the packing of the commodity at a transportation center, (2) a slip which is bonded to the commodity to serve as an identifying tag (hereinafter referred to as "a commodity slip"), (3) a work slip (hereinafter referred to as "a depot slip") which is used at a small depot between the transportation center and the final destination, and (4) a delivery acknowledgement slip which is used to acknowledge the arrival of the commodity at its destination. In other words, when delivery of a commodity is requested by a customer, the department store must prepare a number of different transportation slips which take different forms according to the type of processing which is to take place. The types of data which may be included on the slips are items such as the name of a commodity, the destination or address to which the commodity should be delivered, and the name of the customer.

In the case where a customer requests the department store to deliver commodities to a relatively small number of destinations, frequently the department store will ask the customer to write specified data such as destinations on the slips. More specifically, in such a case, the department store prepares a stack of slips and asks the customer to write the specified data on the slips with carbon sheets inserted therebetween. Alternately, the department store may employ a stack of slips made of pressure-sensitive paper so that carbon paper is not needed. When the number of destinations is relatively small, the department store can readily prepare the various forms of slips as described above.

On the other hand, if the number of destinations to which commodities should be delivered is relatively large, more than ten for instance, the department store ordinarily writes the necessary data on the slips according to a commodity purchase application which is prepared by the customer.

Further, during busy periods and times when many customers request the department store to deliver commodities or gifts to a number of different destinations, the department store may employ any of the following slip processing systems:

(1) a split system,
(2) a manual writing system, and
(3) a copying system.

The split system is illustrated in FIGS. 1a–1c. Here, a customer writes the necessary data on a purchase application 1 through a carbon sheet, and the application is then treated with alcohol and loaded into a printer 2. In this case, a column 3 in which a destination and a commodity name have been written is set on the printer 2 as it is (that is, without being cut off), while a column 4 in which the address, name, and telephone number of the requesting person have been written is cut off and set at a different position on the printer 2. When the printer 2 is operated under this condition, the columns 3 are selected one by one and the data in the column 4 is added to the contents of the columns thus selected. As a result, a number of transportation slips 5A through 5E, which take different forms, are provided as shown in FIG. 1c.

The manual writing system is illustrated in FIGS. 2a and 2b. In this system, a person in the department store copies the necessary data, which have been written on a memo 6 or predetermined from 7 by a customer, onto a plurality of transportation slips 8A through 8B (FIG. 2b) made of pressure-sensitive paper as described before.

The copying system is illustrated in FIGS. 3a and 3b. As shown in FIG. 3a, the department store selects an overlay 12 for a particular customer by referring to a "requesting person" column 11 in a purchase application 9 having a predetermined form in which necessary data have been written by the customer. With the overlay 12 placed on the purchase application 9, transportation slips 13A through 13E are printed by a printer.

The above-described conventional slip processing systems suffer from the following problems:

(i) In the split system or in the copy system, it is impossible to write the necessary data on a plurality of transportation slips in one action. That is, it is necessary to write or print the necessary data as many times as the number of slips. In addition, different forms and the names of individual slips must be printed or copied onto printing sheets or copying sheets.

(ii) In the manual writing system, errors are liable to take place in writing the necessary data, thus lowering the clerical efficiency.

(iii) In the copying system, various processing data can be dealt with. However, it takes labor and time to cut off the copied sheet separately according to the data.

(iv) In all of the above-described systems, a series of slips provided according to one kind of processing data must be returned to the department where the slip or slips are firstly used, after being fixed together with a stapler or the like, so that none of the slips will be separated.

As is apparent from the above description, the conventional slip processing systems are disadvantageous in that not only are they low in slip processing efficiency, but also the data written on the slips may not always be high in reliability.

In view of the foregoing, an object of the invention is to provide a slip processing apparatus in which necessary data can be written onto work slips in a single action, and in which it is unnecessary to cut up any sheets for assembling the work slips or to have to attach a series of work slips to one another.

SUMMARY OF THE INVENTION

In accordance with these and other objects of the invention, there is provided a slip processing apparatus which includes form memory means for storing a slip form, data reading means for reading data necessary for processing a slip, data memory means for storing data read by the data reading means, editing means for distributing predetermined data which are stored by the data memory means to a single or plural positions on the form which is stored by the data memory means, and printer means for printing out on a sheet the data which are edited by the editing means, whereby the data are electronically transferred (or copied) to predetermined positions on the slip forms to obtain hard copies.

BRIEF DESCRIPTION OF THE DRAWINGS

FIGS. 1a, 1b, 1c, 2a, 2b, 3a, 3b are diagrams showing conventional slip processing systems, of which FIG. 1 is an explanatory diagram showing a split system, FIG. 2 is an explanatory diagram showing a manual writing system, and FIG. 3 is an explanatory diagram showing a copying system; and FIGS. 4, 5, 6, 7, 8 and 9 illustrate a preferred embodiment of a slip processing apparatus of the invention, of which FIG. 4 is a prespective view showing the external appearance of a slip processing apparatus according to the invention, FIG. 5 is a block diagram showing the arrangement of the apparatus in FIG. 4, FIG. 6 is a plan view showing a transportation slip form which is inputted to the apparatus, FIG. 7 is a block diagram showing a specific example of a data memory section in FIG. 5, FIG. 8 is a plan view showing an example of a gift purchase application which is inputted to the apparatus, and FIG. 9 is a plan view showing an example of a transportation slip outputted by the apparatus.

DESCRIPTION OF THE PREFERRED EMBODIMENTS

The invention will be described with reference to its preferred embodiments.

Figure 4:
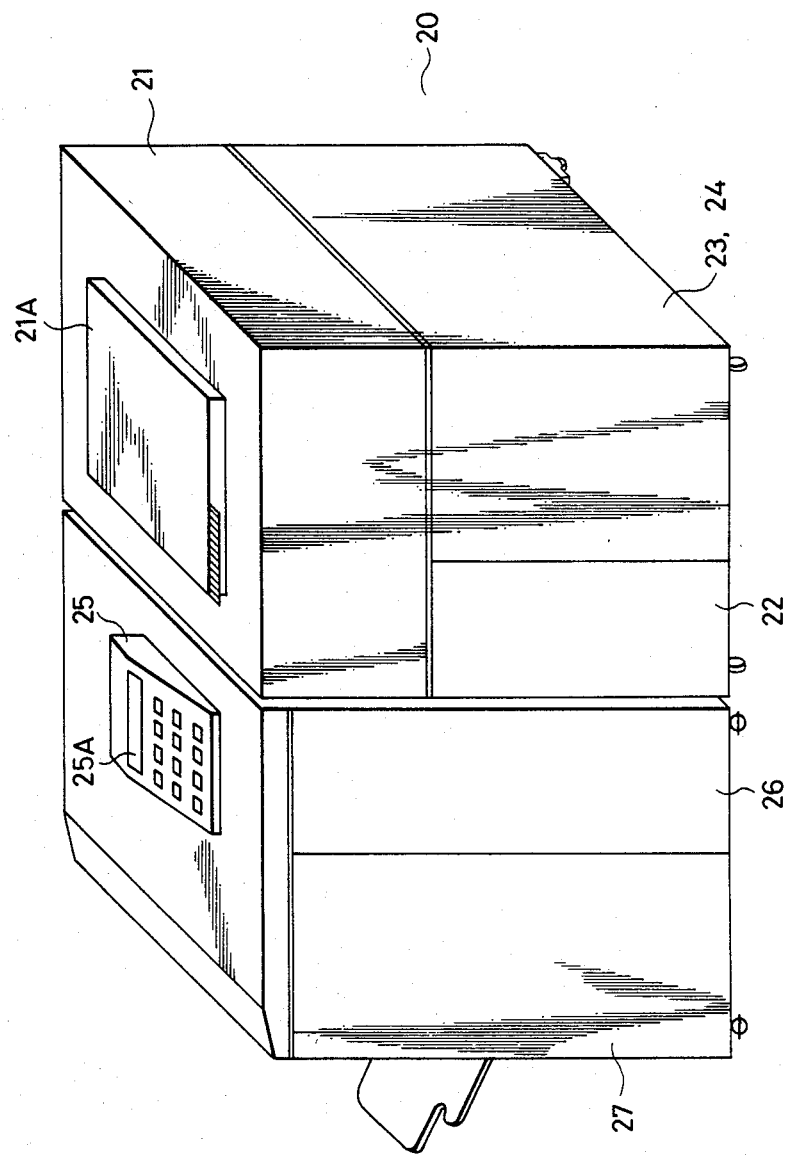
Figure 5:
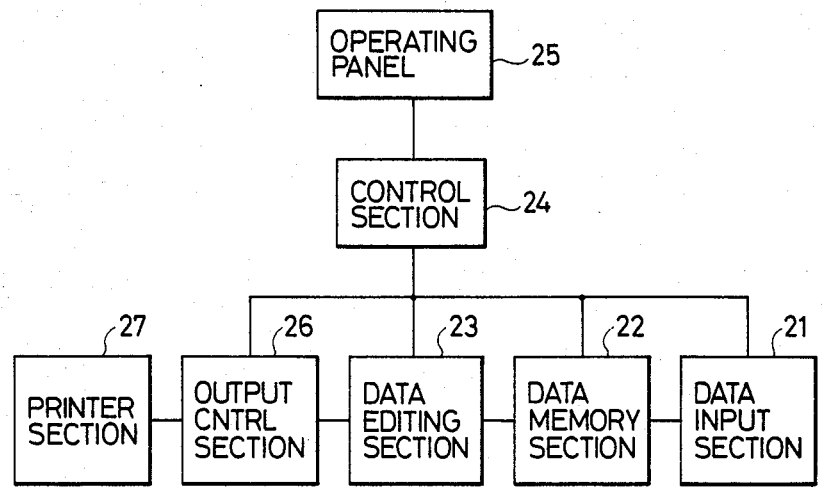

FIG. 4 shows an external view of a slip processing apparatus according to the invention. The slip processing apparatus 20 includes two separate units. The unit at the right-hand side in FIG. 4 includes a data input section 21 on which a platen 21 is provided, a data memory section 22 for storing inputted data, a data editing section 23 for editing the data thus stored, and a control section for carrying out various control functions. The unit at the left-hand side in FIG. 4 includes an operating panel 25, an output control section 26 for controlling the outputting of data, and a printer section 27 for outputting data with a laser beam. These sections are electrically connected as shown in FIG. 5.

In the slip processing apparatus thus arranged, several operations for processing slips are carried out. A first operation is to store a predetermined slip form in the apparatus.

Figure 6:
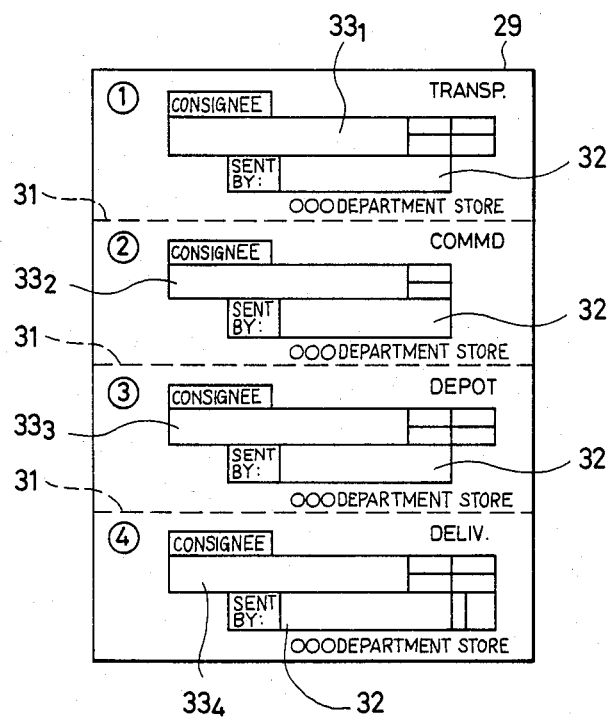

FIG. 6 shows a transportation slip form 29 which may generally be employed in department stores. The transportation slip form 29, in order to be used with the apparatus of the invention, must be generally meet the following requirements:

(i) The form 29 must include a plurality of forms which are prepared according to a specified fixed format. As described above, heretofore, (1) a transportation slip, (2) a commodity slip, (3) a depot slip, and (4) a delivery acknowledgement slip were prepared using separate sheets. On the other hand, in the apparatus of the invention, these slips are prepared using one and the same sheet. That is, the slip form 29 contains a plurality of individual forms which can be separated along perforated lines 31.

(ii) The plural slips included in the form 29 must be arranged in the order in which the prepared slips are to be processed. The slips which are issued from the apparatus are cut off along the perforated lines 31 and then used at the various locations. Therefore, if the slips are suitably arranged, the use of staplers can be eliminated.

(iii) In the plural slips in the form 29, the "requesting person" columns 32 must be equal in size to one another for the following reason. The slips must be processed in such a manner that the name and address of the requesting person are electrically read out of a predetermined column in a "gift purchase application" and then electrically entered in the respective columns. It is not always necessary that the "destination" columns $33_1$ through $33_4$ be equal in size. However, it is preferable that they be equal in size in order to facilitate the processing of data in memories as described below.

The transportation slip form, which satisfies the above-described conditions, is placed on the platen 21A of the data input section 21. In this state, the operator depresses (operates) a form storing switch on the operating panel 25, whereupon the control circuit 24 applies a signal to the data input section 21 to cause the latter to start its reading operation. Upon reception of a start signal, the data input section 21 causes an optical scanner disposed below the platen 21A to scan in an auxiliary scanning direction, whereupon the image of the transportation slip form 29 is provided in the form of a video signal. This video signal is digitized and then inputted to the data memory section 22.

FIG. 7 shows the arrangement of the data memory section 22. The data memory section 22 includes first, second and third memory regions 221, 222 and 223, and a data input/output control circuit 224. When reading the form 29 is started upon depression of the form memory switch as described above, the control circuit 24 applies a form storing instruction signal 35 to the data input/output control circuit 224. Upon reception of the signal 35, the data input/output control circuity 224 supplies a read-write signal 36 to the first memory region 221 so that the latter is ready for writing data. Accordingly, the circuit 224 writes the digitized video signal 38, as the image of the form 29, in the first memory region by supplying addresses thereto as address signals 37.

When the form 29 has been stored in the apparatus as described above, the apparatus is ready for the second operation. In the second operation, the data which have been provided on the gift purchase request by a customer is stored in the apparatus.

FIG. 8 shows an example of a gift purchase application in which necessary data has been written by a customer. The gift purchase application 39 has twelve columns $41_1$ through $41_2$ in which the destinations of commodities are entered, a column 42 in which the name of a requesting person is written, and other columns containing other desired information. The columns $41_1$ through $41_{12}$ and the column 42 correspond to the columns $33_1$ through $33_4$ and the column 32 in FIG. 6, respectively. The columns 41 through $41_{12}$ and the column 42 are equal in size to the columns $33_1$ through $33_4$ and the column 32, respectively. That is, they have space for the same number of letters or numerals.

The completed gift purchase application 39 is placed on the platen 21A of the data input section. After this has been done, the operator operates the data memory switch on the operating panel, whereupon the control circuit 24 applies a read start instruction signal to the data input section 21. Similarly as in the above-described case, the data on the gift purchase application 39 is read.

When reading of the gift purchase application 39 is started, the control circuit 24 applies a signal 44 to the data input/output control circuit 224 to cause the latter to store the data on the application 39. Upon reception of the signal 44, the data input/output control circuit 224 applies a read-write signal 45 to the second memory region 222 so that the latter is ready for writing data. Thus, the circuit 224 operates to write the digitized video signal 29, as the image of the application 39, in the second memory region 222 by supplying addresses thereto as address signals 46.

When all of the data on the gift purchase application 39 has been stored in the apparatus as described above, the apparatus is ready for the third operation. In the third operation, the data stored in the first and second memory regions 221 and 222 are electronically edited for printing slips.

Figure 9:
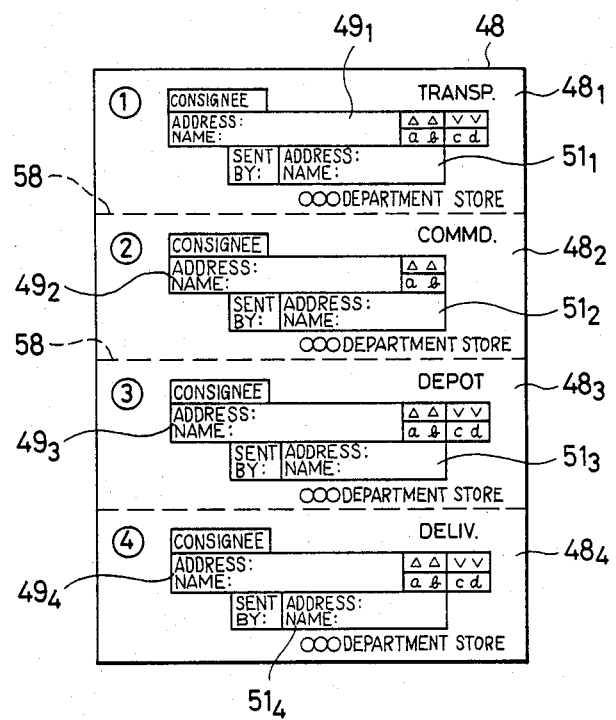

FIG. 9 shows an example of a transportation slip which is issued during the third operation. The transportation slip 48 includes (1) a transportation slip part $48_1$, (2) a commodity slip part $48_2$, (3) a depot slip part $48_3$ and (4) a delivery acknowledgement slip $48_4$ which have destination columns $49_1$, $49_2$, $49_3$ and $49_5$ requesting person columns $51_1$, $51_2$, $51_3$ and $51_4$, respectively. The data on the gift purchase application 39 shown in FIG. 8 have been electronically written in the destination columns and the requesting person columns.

Before the third operation is started, the operator sets operating conditions for the apparatus according to the contents which are displayed on the display section 25A (FIG. 4) on the operating panel 25. The settings are for instance as follows:

(i) Setting of the number of copies.

The number of copies of the transportation slip 48 is set. Only one transportation slip 48 is ordinarily sufficient to handle one case. However, if it is desired to provide additional copies of the transportation slip, it is necessarily to set a plurality of copies. When a plurality of copies is set, a counter (not shown) in the output control section 28 is set to the number of copies, whereupon the printer section 27 prints out as many transportation slips 48 as thus set.

(ii) Setting of the number of cases.

Among the columns $41_1$ through $41_2$ in the gift purchase application 39, ones in which destinations have been written are counted. In the gift purchase application 39 shown in FIG. 8, the number of columns thus counted (or the number of cases) is two. After the number or cases is counted, then a counter (not shown) in the data editing section 23 is set to the number of cases thus counted so that as many transportation slips as the number thus set are printed.

(iii) Setting of the forms.

In the above-described apparatus, only the transportation slip form 29 (FIG. 6) is stored. However, the apparatus may be so designed as to store other forms also. In this case, it is necessary to set a form which is to be used.

After the operating conditions have been set as described above, the operator depresses a slip issuing button on the operating panel. When the slip issuing button is depressed, the data editing section 23 produces a signal 53 for transferring the transportation slip form stored in the first memory region 221 to the third memory region 223. The signal 53 includes address data used for the transfer. When the signal is supplied to the data input/output control circuit 224, the read-write signal 36 is supplied to the first memory region 221 to cause the latter to be ready for reading, while the address where the form 29 has been stored is specified by the address signal 37. The video signal 38 is read out in this fashion. The video signal 38 thus read is written, as the image of the form 29, in the third memory region 223 as instructed by a read-write signal 54 which specifies the writing state and an address signal 55 for specifying addresses.

In succession with this, the data editing section 23 produces a signal 56 for transferring a part of the data stored in the second memory region 222 to the third memory region 223 under the control of the control section 24. In this case, the signal 56 which is supplied to the data input/output control circuit 224 includes address data for specifying the reading position of the first column $41_1$ (FIG. 8) in which a destination is written and address data for specifying the writing positions of the "destination" columns $49_1$ through $49_4$ (FIG. 9). These address data have been stored in a memory (not shown) in the data editing section 23 by using keys on the operating panel 25.

When the signal 56 is supplied to the data input/output control circuit 224, the read-write signal 54 is applied to the second memory region 222 to cause the latter to be ready for reading. Also, the stored address of the data written in the first column $41_1$ is specified by the address signal 46. When these signals are applied, the video signal 38 is read out. The video signal 38 thus read is written into a portion of the third memory region which corresponds to the first column $49_1$ under the control of the read-write signal 54 which specifies the writing state and the address signal 55 for specifying the address of the first "destination" column $49_1$. Similarly, the second, third and fourth "destination" columns $49_2$, $49_3$ and $49_4$ are successively written into with the aid of the address signals 55. The video signal 38 read out of the portion of the second memory region 222 which corresponds to the first column 41 is written into the areas which correspond to the second, third and fourth columns $49_2$, $49_3$ and $49_4$. However, since it is unnecessary to write a price in the second column $49_2$, writing in that column as to the price is not carried out.

After the data in the first column $41_1$ have been transferred as described above, the data editing section 23 produces a signal 56 which includes address data for specifying the reading position of the column 42 (FIG. 8) in which the name of the requesting person is written and address data for specifying the writing position of the "requesting person" columns $51_1$ through $51_4$ (FIG. 9). This address data was stored in the memory in the data editing section 23 in advance.

When the signal 56 is supplied to the data input/output control circuit 224, in the same procedure as that described above, the data relating to the requesting person is transferred to the portions which correspond to the "requesting person" columns $51_1$ through $51_4$.

When the above-described operations of the data editing section 23 are accomplished, the control section 24 instructs the output control section 26 to start issuing slips. In response to this instruction, the output control section 26 produces a signal 57 which starts the outputting of an image which is composed in the third memory region 223. Upon reception of the signal 57, the data input/output control circuit 224 outputs the read-write signal 54 for specifying the reading state and the address signal 55 for specifying addresses, whereupon the third memory region 223 outputs the video signals 38. The video signal 38 is supplied to the printer section 37 where printing is carried out in response thereto. As a result, a transportation slip 48 as shown in FIG. 9 is obtained. Thereafter, the apparatus operates to issue the succeeding transportation slips using the same procedure.

The transportation slip 48 issued by the apparatus of the invention is divided into slip parts $48_1$ through $48_4$ by the perforated lines on the border lines 58 thereof. Therefore, in handling a commodity to be transported, the slip parts can be used after being separated from one another beginning from the top. With this procedure, the slip parts will not be separated from the commodity that they identify. However, no stapling is needed. Furthermore, since the slip parts are prepared on one sheet, no collation is required, thereby facilitating the clerical work.

As is clear from the above description, according to the invention, processing data is developed as electronic images at a plurality of predetermined positions on a sheet of slips. Therefore, no errors or mistakes are made in transferring data. Thus, the slip, which is obtained as a hard copy, can readily be checked.

Furthermore, according to the invention, the slip form is stored in the apparatus and printed out in the form of an image combined with processing data. Accordingly, it is unnecessary to preprint the slip form and to set the preprinted forms in a printer in a predetermined order. In addition, the apparatus is advantageous in that it can simplify the clerical work.

In the above-described slip processing apparatus, the slip form is read to produce a video signal and the video signal is stored in a memory. However, it goes without saying that the apparatus may be so modified that a floppy disk, for instance, is provided in the apparatus so that the slip form can be externally stored if required.

Furthermore, in the above-described apparatus, in the editing operation of the data editing section, first the "destination" data is written in the respective regions of the third memory region, and then the "requesting person" data is written. However, it goes without saying that the "destination" data and the "requesting person" data may be alternately written in the order of addresses in the third memory region.

We claim:

1. A slip processing apparatus, comprising:
   form memory means for storing a slip form as an image;
   data reading means for reading data necessary for processing a slip;
   data memory means for storing as an image, data read by said data reading means;
   editing means for distributing predetermined data stored in said data memory means to at least one predetermined position on said form which is stored by said data memory means; and
   printer means for printing out on a sheet data distributed by said editing means;
   wherein said data memory means comprises first and second memory regions, said first memory region storing unedited data to be distributed and printed out on said sheet, and said second memory region stores data distributed by said editing means, and wherein said printing means prints out on said sheet data from said second memory region.

2. The slip processing apparatus of claim 1, wherein said image of said slip form stored in said form memory means comprises a plurality of identical transportation slips on one sheet.

3. The slip processing apparatus of claim 2, wherein each of said transportation slips includes a first predetermined region for identifying data of a consignee and a second predetermined region for identifying data of a requesting person.

4. The slip processing apparatus of claim 3, wherein data read by said data reading means is in the form of applications comprising a plurality of third predetermined regions for identifying data of consignees and a single fourth predetermined region for identifying data of a requesting person.

5. The slip processing apparatus of claim 4, wherein said editing means distributes data from said third predetermined regions to corresponding ones of said first predetermined regions and distributes data from said fourth predetermined region to said second predetermined regions.

6. The slip processing apparatus of any one of claims 1 and 2-5 wherein said data reading means comprises optical scanning means.

* * * * *